(12) United States Patent
Vorovitchik

(10) Patent No.: US 8,964,072 B2
(45) Date of Patent: Feb. 24, 2015

(54) LIGHT FILTER WITH VARYING POLARIZATION ANGLES AND PROCESSING ALGORITHM

(75) Inventor: Shlomo Vorovitchik, Moshav Faran (IL)

(73) Assignee: Vorotec Ltd., Moshav Foran (IL)

( * ) Notice: Subject to any disclaimer, the term of this patent is extended or adjusted under 35 U.S.C. 154(b) by 185 days.

(21) Appl. No.: 13/578,444

(22) PCT Filed: Feb. 24, 2011

(86) PCT No.: PCT/IL2011/000189
§ 371 (c)(1),
(2), (4) Date: Aug. 10, 2012

(87) PCT Pub. No.: WO2011/104714
PCT Pub. Date: Sep. 1, 2011

(65) Prior Publication Data
US 2012/0307128 A1    Dec. 6, 2012

Related U.S. Application Data

(60) Provisional application No. 61/308,077, filed on Feb. 25, 2010.

(51) Int. Cl.
*H04N 13/04* (2006.01)
*H04N 3/14* (2006.01)
*G02B 27/28* (2006.01)

(52) U.S. Cl.
CPC ................................ *G02B 27/288* (2013.01)
USPC ............................................. 348/272; 348/57

(58) Field of Classification Search
USPC .............. 348/207.99, 207.2, 218.1, 335, 294, 348/302, 333.01, 362, 221.1, 222.1
See application file for complete search history.

(56) References Cited

U.S. PATENT DOCUMENTS 3,917,408 A    11/1975    Stachnik
4,577,414 A    3/1986    Migliori et al.
(Continued)

FOREIGN PATENT DOCUMENTS

CN    1789916 A    6/2006
CN    1847927 A    10/2006
(Continued)

OTHER PUBLICATIONS

Abstract of Bernard et al; "Functional similarities between polarization vision and color vision;" Vision Research; 1977; pp. 1019-1028; vol. 17; issue 9.
(Continued)

*Primary Examiner* — Tuan Ho
*Assistant Examiner* — Selam Gebriel
(74) *Attorney, Agent, or Firm* — Oliff PLC

(57) ABSTRACT

A method, system and polarization filter for analyzing polarization properties of light are described, the method comprising: receiving image data from a plurality of image sensor cells, the image sensor cells comprised in an image sensing system; separating from the received image data polarization information and scene image data of a scene being captured; and processing the polarization information to deduce information. Additionally, a polarization filter for analyzing polarization properties of light is described, the polarization filter comprising an array of polarization cells in various directions of polarization, the polarization filter comprising a core array of at least horizontal polarization filter cell, vertical polarization filter cell, no-polarization filter cell and circular polarization filter cell.

13 Claims, 3 Drawing Sheets

(56) References Cited

U.S. PATENT DOCUMENTS

| | | | |
|---|---|---|---|
| 5,424,535 | A | 6/1995 | Albion et al. |
| 5,692,226 | A * | 11/1997 | Hall .............................. 396/326 |
| 6,075,235 | A * | 6/2000 | Chun ........................ 250/208.1 |
| 7,697,203 | B2 | 4/2010 | Cha et al. |
| 8,045,163 | B2 | 10/2011 | Grau |
| 8,238,026 | B1 * | 8/2012 | Kemme et al. ........... 359/489.17 |
| 8,462,435 | B2 * | 6/2013 | Aoki ........................ 359/486.01 |
| 2002/0171881 | A1 | 11/2002 | Merrill et al. |
| 2007/0229955 | A1 | 10/2007 | Kawamura et al. |
| 2008/0258051 | A1 | 10/2008 | Heredia et al. |
| 2009/0021598 | A1 | 1/2009 | McLean et al. |
| 2009/0278954 | A1 | 11/2009 | Kanamori et al. |
| 2010/0208060 | A1 * | 8/2010 | Kobayashi et al. ........... 348/135 |
| 2010/0303344 | A1 * | 12/2010 | Sato et al. ...................... 382/162 |
| 2010/0309291 | A1 * | 12/2010 | Martinez et al. ................ 348/47 |
| 2010/0321476 | A1 * | 12/2010 | Martinez et al. ................ 348/49 |
| 2011/0050854 | A1 * | 3/2011 | Kanamori et al. ............. 348/46 |
| 2011/0058038 | A1 * | 3/2011 | Twede .......................... 348/148 |
| 2012/0126123 | A1 * | 5/2012 | Kondo et al. .............. 250/341.1 |

FOREIGN PATENT DOCUMENTS

| | | |
|---|---|---|
| CN | 101046523 A | 10/2007 |
| CN | 101218522 A | 7/2008 |
| JP | A-2004-117478 | 4/2004 |
| JP | A-2008-26353 | 2/2008 |
| JP | A-2009-55624 | 3/2009 |
| JP | A-2009-139356 | 6/2009 |
| JP | A-2009-139973 | 6/2009 |
| JP | A-2009-157043 | 7/2009 |
| JP | A-2009-290895 | 12/2009 |
| JP | A-2010-25915 | 2/2010 |

OTHER PUBLICATIONS

Blum et al; "Photoreceptor visual fields, ommatidial array, and receptor axon projections in the polarisation-sensitive dorsal rim area of the cricket compound eye;" Journal of Comparative Physiology A.; 2000; pp. 119-128; vol. 186; Springer-Verlag.

Abstract of Brunner et al; "Behavioural evidence for polarization vision in crickets;"Physiological Entomology; Mar. 1987; pp. 1-10; vol. 12, Iss. 1; Zurich, Switzerland.

Abstract of Burghause; "Die strukturelle Spezialisierung des dorsalen Augenteils der Grillen (Orthoptera, Grylloidea);" Zool. Jb. Physiol., 1979; pp. 502-525; vol. 83.

Herzmann et al; "Spectral sensitivity and absolute threshold of polarization vision in crickets: a behavioral study;" Journal of Comparative Physiology A.; 1989; pp. 315-319; vol. 165; Springer-Verlag.

Abstract of Labhart; "Polarization-opponent interneurons in the insect visual system;" Nature; 1988; pp. 435-437; vol. 331; Nature Publishing Group; Zurich, Switzerland.

Labhart; "How polarization-sensitive interneurones of crickets perform at low degrees of polarization;" Journal of Experimental Biology; 1996; pp. 1467-1475; vol. 199; The Company of Biologists Limited; Great Britain.

Abstract of Labhart; "How polarization-sensitive interneurons of crickets see the polarization pattern of the sky: a field study with an opto-electronic model neurone;" The Journal of Experimental Biology; 1999; pp. 757-770; vol. 202; The Company of Biologists Limited; Great Britain.

Labhart; "Polarization-sensitive interneurons in the optic lobe of the desert ant *Cataglyphis bicolor*;" Naturwissenschaften; 2000; pp. 133-136; vol. 87; Springer-Verlag.

Labhart et al; "The physiology of the cricket's compound eye with particular reference to the anatomically specialized dorsal rim area;" Journal of Comparative Physiology A; 1984; pp. 289-296; vol. 155; Springer-Verlag.

Abstract of Labhart et al; "Detectors for polarized skylight in insects: a survey or ommatidial specializations in the dorsal rim area of the compound eye;" Microscopy Research and Technique Special Issue: Insect Sensory Structures; Dec. 1999; pp. 368-379; vol. 47, Iss. 6; Wiley-Liss, Inc.; Zurich, Switzerland.

Abstract of Labhart et al; "Processing of polarized light information in the visual system of crickets;" Sensory Systems of Arthropods; 1993; pp. 158-168.

Abstract of Lambrinos et al; "An Autonomous Agent Navigating with a Polarized Light Compass;" Adaptive Behavior; Jun. 1997; pp. 131-161; vol. 6, Iss. 1; Sage Journals.

Abstract of Petzold; "Polarisationsempfindliche Neuronen im Sehsystem der Feldgrille, *Gryllus ampestris*: Elektrophysiologie, Anatomie and Modellrechnungen;" PhD Thesis; 2001; University of Zurich.

Schwind et al; "Reflection-Polarization Pattern at Water Surfaces and Correction of a Common Representation of the Polarization Pattern of the Sky;" Naturwissenschaften; 1993; pp. 82-83; vol. 80; Springer-Verlag.

Ukhanov et al; "Dioptrics of the facet lenses in the dorsal rim area of the cricket *Gryllus bimaculatus*;" Journal of Comparative Physiology A; 1996; pp. 545-552; vol. 179; Springer-Verlag.

Abstract of Waterman; "Polarization sensitivity;" Comparative Physiology and Evolution of Vision in Invertebrates B, Invertebrate Visual Centers and Behavior I; pp. 281-469; Springer-Verlag; Berlin, Heidelberg, New York. 1981.

Abstract of Wehner; "The ant's celestial compass system: spectral and polarization channels;" Orientation and Communication in Arthropods; 1997; pp. 145-185; Birkhauser Verlag; Basel.

Wehner; "Polarization vision—a uniform sensory capacity?;" Journal of Experimental Biology; 2001; pp. 2589-2596; vol. 204; The Company of Biologists Limited; Great Britain.

Zufall et al; "Spectral and polarized light sensitivity of photoreceptors in the compound eye of the cricket (*Gryllus bimaculatus*);" Journal of Comparative Physiology A; 1989; pp. 597-608; vol. 164; Springer-Verlag.

Labhart et al; "Spatial integration in polarization-sensitive interneurones of crickets: a survey of evidence, mechanisms and benefits;" Journal of Experimental Biology; 2001; pp. 2423-2430; vol. 204; The Company of Biologists Limited; Great Britain.

Kobayashi et al.; "Navigating with a Polarized Light Compass;" *Proceedings of the 14th Annual Conference of the Robotics Society of Japan*; Nov. 1, 1996; p. 171-172; No. 1 (with English-language Abstract).

* cited by examiner

LIGHT FILTER WITH VARYING POLARIZATION ANGLES AND PROCESSING ALGORITHM

BACKGROUND OF THE INVENTION

As the use of machine imaging and image processing develops in various fields such as, for example, security, gaming, medicine, military, science and plastic arts, there is a growing need for highly advantageous image processing and analysis tools.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
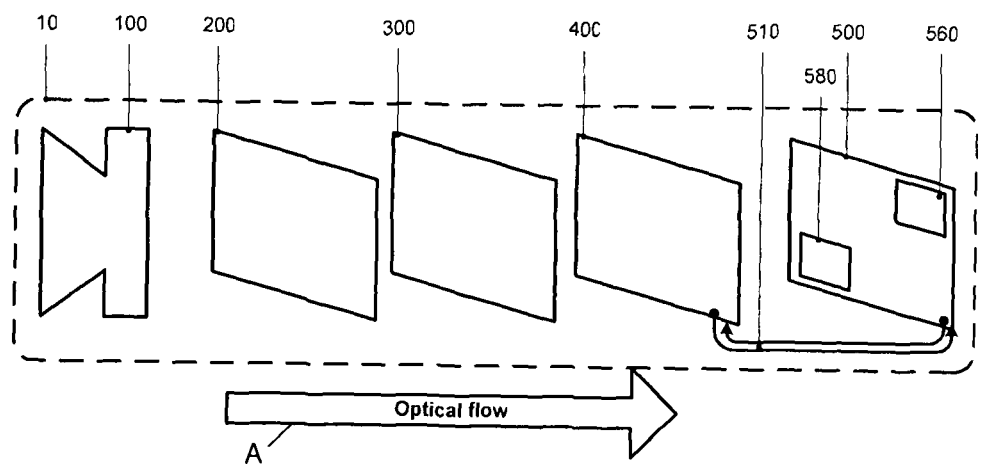
FIG. 1 is a schematic illustration of an image sensing system for analyzing polarization properties of light according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the present invention may provide a light polarization filter and system for analyzing polarization properties of the light captured by an image sensor. The light polarization filter according to embodiments of the present invention may reveal polarization properties of light captured by an image sensor. The information about polarization properties of the captured light may be used, for example, for image analysis by a human and/or by a processor, for example, in a machine vision and/or inspection systems. The analysis of the polarization properties may be used, for example, for deducing information about the objects being imaged and/or for detection of certain elements and/or properties of elements in the image. Additionally, in some embodiments of the present invention, the information about polarization properties of the captured light may be used, for example, for processing and/or improvement of the captured image, for calibration of the image sensor and/or for adjustment of light sources which may be used for capturing the image.

A system according to embodiments of the present invention may be embedded in various kinds of imagers, cameras, scanners and other image sensors, and thus, for example, may enable capturing an enhanced image with additional layers of information, which may be deduced from the polarization properties revealed by the polarization filter.

Reference is now made to FIG. 1, which is a schematic illustration of an image sensing system 10 for analyzing polarization properties of light according to some embodiments of the present invention. System 10 may include an optical element 100 for collecting light, a polarization filter 200, a wavelength filter 300, an image sensor 400 and an image processing system 500. Image processing unit 500 may include a processor 560 and a non-transitory storage media 580, wherein a non-transitory storage media may include any storage media accept for a transitory, propagating signal. Image processing unit 500 may communicate with image sensor 400 and optionally with other elements of system 10 such as, for example, wavelength filter 300 and/or optical element 100, via a two way data link 510. System 10 may receive light via optical element 100 and let it flow in the direction of arrow A. Although in FIG. 1 polarization filter 200 is shown between optical element 100 and wavelength filter 300, the invention is not limited in this respect and polarization filter 200 may be positioned in other locations in system 10. For example, in some embodiments filter 200 may be located between wavelength filter 300 and image sensor 400 or, for example, may be embedded in image sensor 400. In other embodiments filter 200 may be located, for example, in front of optical element 100 so that light may pass through filter 200 before collection by optical element 100.

Polarization filter 200 may include an array of polarization cells in various directions of polarization, as will be described in more detail with reference to FIG. 2. The array of cells may include a plurality of repeated sub-arrays of polarization cells in various directions of polarization, for example, in a repeated pattern. A polarization cell of polarization filter 200 may correspond to a respective cell or predetermined group of cells of image sensor 400, so that substantially all the light received onto a cell or predetermined group of cells of image sensor 400 has passed through the respective polarization cell of polarization filter 200.

Wavelength filter 300 may include an array of wavelength filtering cells in various colors, as will be described in more detail with reference to FIG. 3. The array of cells may include a plurality of repeated sub-arrays of wavelength filtering cells in various colors, for example, in a repeated pattern such as, for example, in a Bayer filter. A sub-array of wavelength filtering cells may correspond to a respective polarization cell of polarization filter 200 and to its respective cell or predetermined group of cells of image sensor 400 so that substantially all the light received onto a cell or predetermined group of cells of image sensor 400 has passed through both the respective polarization cell of polarization filter 200 and the respective sub-array of wavelength filtering cells in various colors. In some embodiments of the present invention, a wavelength filtering cell of wavelength filter 300 may correspond to a predetermined respective cell or sub-group of cells, within the predetermined group of cells in image sensor 400 which correspond to a certain polarization cell.

Accordingly, a cell of image sensor 400 may receive light in a certain color and certain polarization. Additionally, light component with certain polarization property that passed a corresponding polarization cell, may be received onto the corresponding predetermined group of image sensor cells after passing the respective wavelength filtering cells, and thus each image sensor cell in the predetermined group may receive the polarized light component in a different color. A data base of relations of each image sensor cell with the respective wavelength filtering cell and polarization cell may be stored in non-transitory storage media 580. Since the image sensor cells can be related to their respective polarization and color cells, comparison between the intensities of light received in several cells, for example, of adjacent groups which relate to different polarization cells, may enable deduction of information, for example, about objects being imaged, illumination conditions, calibration of image sensor 400, wavelength filter 300 and/or optical element 100 and so forth. The analysis of the polarization and/or color information may be performed, for example, by image processing unit 500.

As mentioned above, image processing unit 500 may deduce calibration information from the polarization and/or color properties of light received onto cells of image sensor 400. In some embodiments of the present invention, based on the deduced calibration information, image processing unit 500 may change calibration of image sensor 400, wavelength filter 300 and/or optical element 100, for example by control messages via data link 510.

Figure 2:
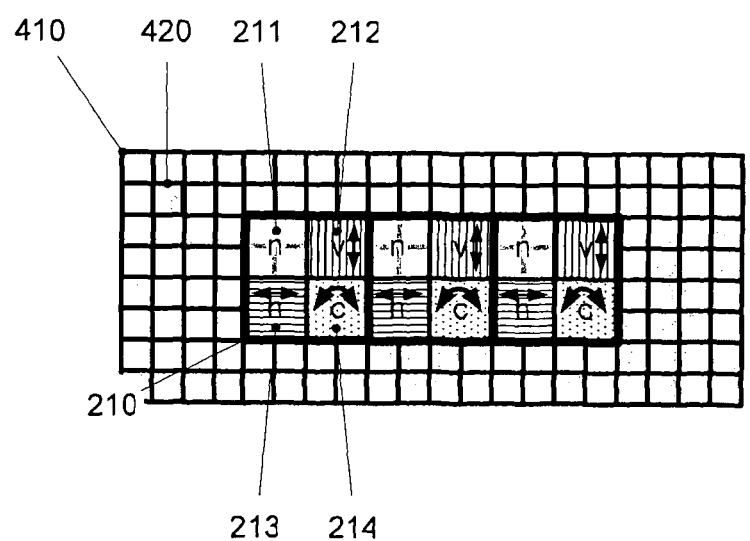
FIG. 2 is a top view schematic illustration of polarization filter sub-arrays over an array of image sensor cells according to some embodiments of the present invention.

Reference is now made to FIG. 2, which is a top view schematic illustration of polarization filter sub-arrays 210, which may be included in polarization filter 200 described above, over an array 420 of image sensor cells 410 that may be included in image sensor 400, according to some embodiments of the present invention. A sub-array 210 may include several polarization cells 211, 212, 213 and 214 with different polarization properties. Although FIG. 2 depicts four polarization cells in each sub-array 210, any other number of polarization cells may be included in a sub-array 210, as long as at least two polarization cells with different polarization properties are included in the same sub-array 210. For example, polarization cell 211 may be a reference cell which transmits substantially all light, polarized and not polarized. Polarization cell 212 may transmit only linearly polarized light in one direction, for example vertically polarized light. Polarization cell 213 may transmit only linearly polarized light in another direction, for example horizontally polarized light. Polarization cell 214 may transmit only circularly polarized light. In some embodiments of the present invention, the same arrangement of polarization cells may be included in each sub-array 210, for example so as to form a repeating pattern of polarization cells. However, in other embodiments, different sub-arrays 210 may include different polarizing cells and/or different arrangements. According to some embodiments of the present invention, as illustrated in FIG. 2, each polarization cell 211, 212, 213 and 214 may be aligned over a corresponding group of image sensor cells 410, for example four sensor cells 410 as illustrated in FIG. 2, so that each polarization cell fits in size, shape and alignment to a respective group of four cells 410. In other embodiments of the present invention, an optical element between polarization filter 200 and image sensor 400 may direct the light passing through a polarization cell 211, 212, 213 or 214 to the respective group of image sensor cells 410 and thus, for example, an exact superposition of a polarization cell over the respective group of cells 410 may not be required.

Figure 3:
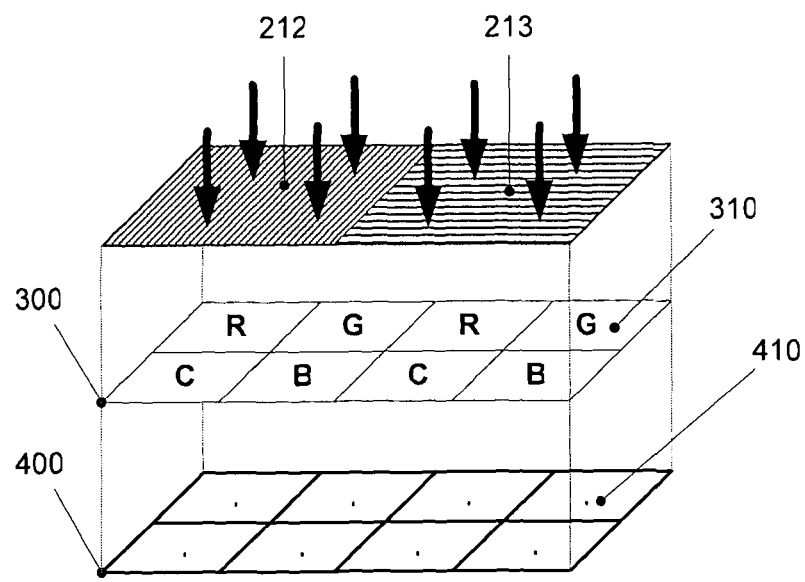
FIG. 3 is a sectional layered schematic illustration of a polarization filter, a wavelength filter and an image sensor arranged according to some embodiments of the present invention.

Reference is now made to FIG. 3, which is a sectional layered schematic illustration of polarization filter 200, wavelength filter 300 and image sensor 400 arranged according to some embodiments of the present invention. In the sectional view of FIG. 3, an exemplary portion of image sensor 400 is shown including several image sensor cells 410. A respective portion of wavelength filter 300 may include a corresponding number of wavelength filtering cells 310 of various colors. A respective portion of polarization filter 200 may include two adjacent polarization cells with different polarization properties, such as vertical and horizontal polarization cells 212 and 213 or any other possible polarization cells as described above. Wavelength filtering cells 310 may be arranged in repeating sub-arrays of wavelength filtering cells 310 of various colors. For example, each of polarization cells 211, 212, 213 and 214 or another may be aligned with a respective sub-array of wavelength filtering cells 310 of wavelength filter 300. Additionally, each wavelength filtering cell 310 may be aligned with an image sensor cell 410, so that, for example, a certain cell 410 may receive light that passed through a respective wavelength filtering cell 310 in a certain color and through a respective polarization cell 211, 212, 213 or 214 or another with a certain polarization property. Additionally, light component with Additionally, light component with certain polarization property that passed a corresponding polarization cell, may be received onto several image sensor cells 410 after passing respective wavelength filtering cells 310, and thus each of the several cells 410 may receive the polarized light in a different color. For this purpose, wavelength filter 300 and polarization filter 200 are interchangeable, i.e. the light may pass through polarization filter 200 and then through wavelength filter 300 or vice versa.

Figure 4:
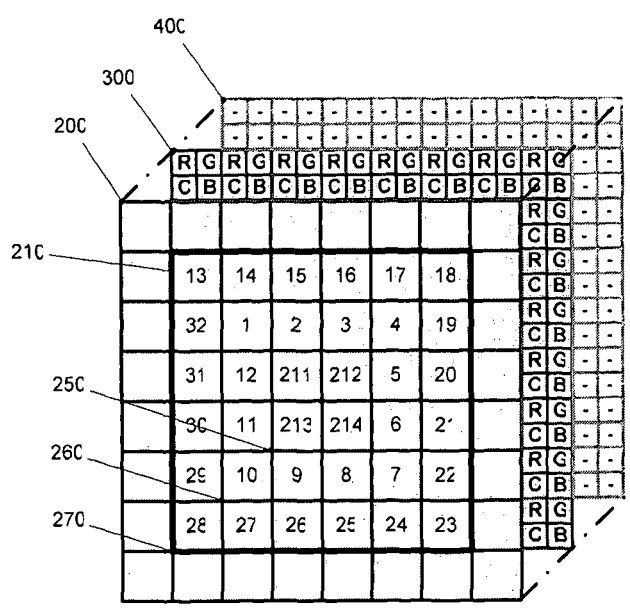
FIG. 4 is a schematic illustration of an exemplary sub-array of polarization cells according to some embodiments of the present invention.

Reference is now made to FIG. 4, which is a schematic illustration of an exemplary sub-array 210 of polarization cells of polarization filter 200 according to some embodiments of the present invention. Sub-array 210 may include a core array 250 of polarization cells 211, 212, 213 and 214 with no polarization, vertical polarization, horizontal polarization and circular polarization, respectively, as described in detail above with reference to FIG. 2. Additionally, sub-array 210 may include layer 260 of polarization cells 1 to 12 surrounding core array 250 and layer 270 of polarization cells 13-32 surrounding layer 260. Similarly, sub-array 210 may include additional surrounding layers of polarization cells. At least some of the polarization cells in surrounding layers 260, 270 and so forth may have various linear polarization directions. In some embodiments of the present invention, in each layer, the linear polarization cells may have different linear polarization directions, wherein the polarization phase difference between adjacent linear polarization cells in a layer may be determined by dividing 360 degrees by the number of linear polarization cells in the layer. For example, in layer 260, which may include, for example, 12 cells, the polarization phase difference between adjacent cells may be about 30 degrees. In layer 270, which includes 20 cells, the polarization phase difference between adjacent cells may be about 18 degrees. Additional layers which may include more cells may provide smaller phase differences between adjacent cells, thus, for example, enabling detection of finer details of polarization information and/or more accurate deduction of information based on the revealed polarization information. In some embodiments of the present invention, surrounding layers 260, 270 and so forth may include additional reference cells with no polarization such as cell 211, optionally with different transparency levels. In some embodiments of the present invention, surrounding layers 260, 270 and so forth may include additional circular polarization cells such as cell 214, optionally with different directions of circular polarization (such as clockwise or counterclockwise circular polarization).

Although FIGS. 2, 3 and 4 illustrate square-shaped polarization cells, wavelength filtering cells and image sensor cells, it will be appreciated that according to some embodiments of the present invention, other geometrical shapes of cells are possible, such as, for example, circular or hexagonal cells. Additionally, different patterns and shapes of cell arrays and/or sub-arrays than shown in the drawings are possible.

Figure 5:
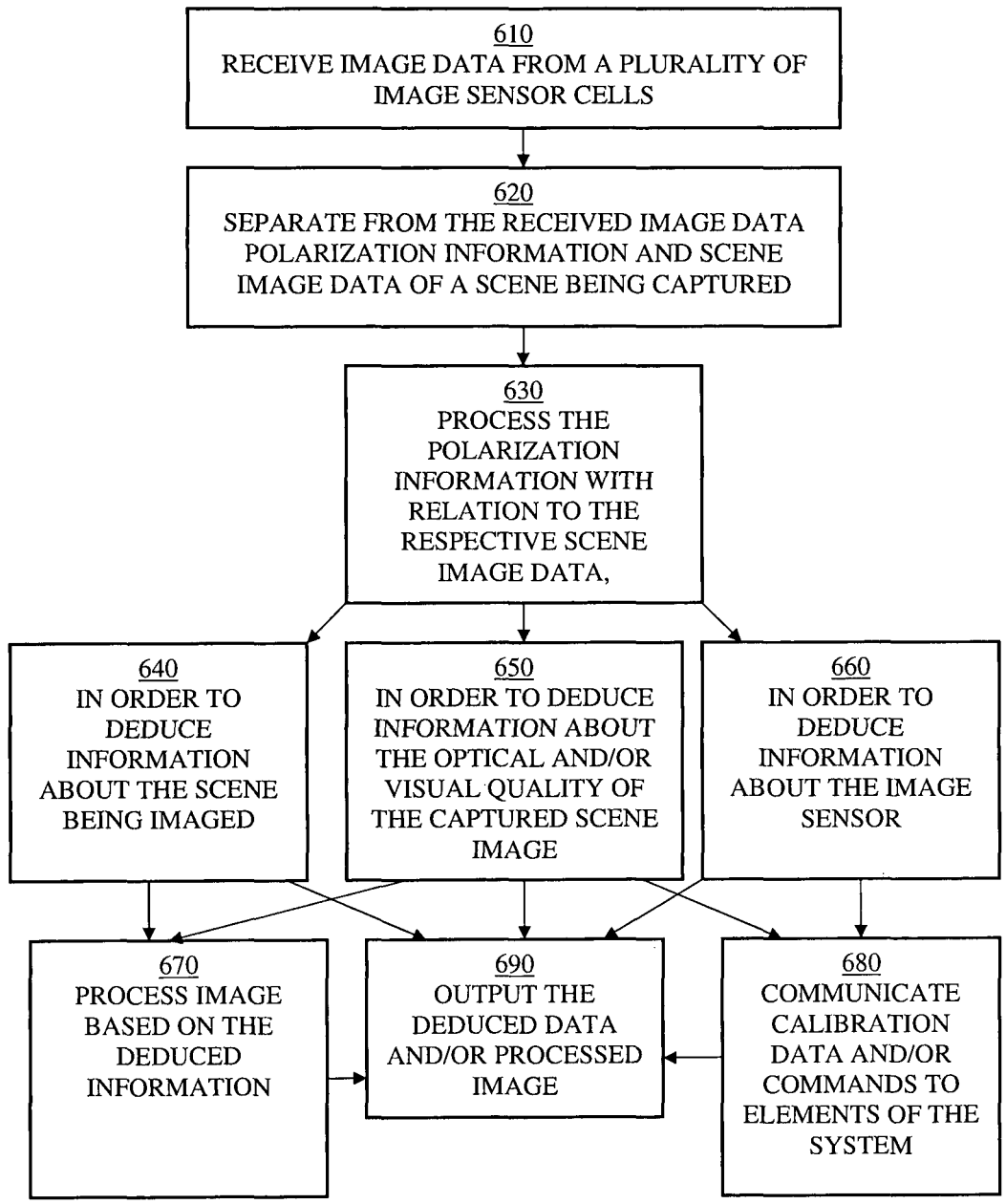
FIG. 5 is a schematic flowchart illustrating a method for analyzing polarization properties of light according to some embodiments of the present invention.

Reference is now made to FIG. 5, which is a schematic flowchart illustrating a method for analyzing polarization properties of light according to some embodiments of the present invention. As indicated in block 610, the method may include receiving, for example at image processing unit 500, image data from a plurality of image sensor cells 410 of image sensor 400. As described in detail above, image sensor 400, wavelength filter 300 and polarization filter 200 are aligned so that, for example, light component with certain polarization property that passed a corresponding polarization cell, may be received onto several image sensor cells 410 after passing respective wavelength filtering cells 310, and thus each of the several cells 410 may receive the polarized light in a different color. Accordingly, based on data relating each image sensor cell 410 to the corresponding polarization cell and wavelength filtering cell, comparisons of image data received from several image sensor cells 410 may enable deduction of color, intensity and polarization data.

As indicated in block 620, the method may include separating from the received image data polarization information and scene image data of a scene being captured. The polarization information and scene image data may be deduced for example, by comparing image data received from a group of several image sensor cells 410. The analysis of the image data, including comparisons of the image data and deduction of information, may be performed, for example, by processor 560 of image processing unit 500. The separated polarization information may be related to a certain image pixel, which may be defined by the group of image sensor cells from which the polarization information is being deduced. For example, the group of image sensor cells may correspond to a sub-array 210 of polarization cells, for example, as described above with reference to FIG. 2. The separated polarization information may include the degree and direction of linear polarization, the degree and direction of circular polarization, and the total intensity. The polarization information may be represented by Stokes parameters of polarization, from which the intensity and polarization information may be deduced.

As indicated in block 630, the method may include processing the polarization information, for example, with relation to the respective scene image data, in order to deduce information about the scene being imaged, the image optical quality and/or the image sensor.

As indicated in block 640, processing of the polarization information, for example, with relation to the respective scene image data, may be performed in order to deduce information about the scene being imaged such as, for example, illumination direction and/or intensity, physical properties of objects being imaged and/or detection of certain kinds of objects and/or scenes. For example, since reflection of light from certain kinds of materials affects the polarization of light in a known manner, information about the materials from which objects and/or surfaces are made of may be deduced based on the polarization information. Moreover, particular light sources with particular polarization properties and/or patterns may be used for illuminating the imaged scene, for detection of particular kinds objects/surfaces based on the polarization information received from image sensor cells 410.

Additionally, based on the polarization information, sizes and/or shapes of objects and/or distances of objects from the image sensor may be deduced. Based on analysis of the size and/or shape of an object, the object may be identified. Additionally, based on the polarization information, information about the medium between the image sensor and the imaged object/surface may be deduced, such as, for example, information about materials existing in the air/water/other medium between the image sensor and the imaged object/surface. Such information about materials may be indicative, for example, of air/water pollution. Additionally, based on the polarization information, information about natural light sources and/or artificial light sources in the imaged scene may be detected, such as location, direction, intensity, glare, etc., for example, by analyzing the degree and direction of linear polarization. The ability to process the polarization information in order to deduce information about the scene being imaged, which is provided by embodiments of the present invention, may be used, for example, in remote sensing systems, machine vision systems, automatic sorting machines, computerized face and/or other feature detection, medical imaging and many other applications.

As indicated in block 650, processing of the polarization information, for example, with relation to the respective scene image data, may be performed in order to deduce information about the optical and/or visual quality of the captured scene image. For example, certain kinds of color distortions on the scene image may be correlated with high degree of linear polarization, such as color distortions caused by light reflections from surfaces in the scene. Other kinds of color distortions on the scene image may be correlated with low degree of linear polarization, such as color distortions caused by unpolarized light radiated from a light source in the scene. By analyzing the polarization information, regions with color distortions and the nature of color distortions may be detected and, thus for example, correction of the image may be enabled. Additionally, based on the polarization information, regions of haze and/or glare may be detected, which may result, for example, from the quality of the medium between the image sensor and the imaged objects\ surfaces. The haze and/or glare properties of the image may be isolated from the image data by identifying the regions of polarization properties which correlate with the haze and/or glare, thus, for example, enabling correction of the image by subtraction of the haze and/or glare data.

As indicated in block 660, processing of the polarization information, for example, with relation to the respective scene image data, may be performed in order to deduce information about the image sensor. For example, based on the polarization data and, for example, a given direction of illumination, information about position and/or motion of the image sensor may be deduced. Additionally, based on the polarization information, the level of dark current noise of the image sensor cells may be detected. Additionally, image sensor cells which relate to different polarization properties may require different exposure times, for example, because of different intensities. Therefore, based on the image data received from an image sensor cell, under or over-exposure of image sensor cells which relate to particular polarization properties may be detected.

As indicated in block 670, the method may include processing and/or enhancing and/or modifing image based on the deduced information. For example, based on the information about the optical and/or visual quality of the captured scene image, and based on correlation between the visual quality of the image and polarization properties, the image may be processed to remove defects such as, for example, color distortions, haze and/or glare. Additionally, as described above, polarization filter 200 may include repeating sub-arrays of polarization cells of various polarization properties. Therefore, polarization cells with similar polarization properties may be located in constant distances over the polarization filter 200. Accordingly, image sensor 400 may include groups of image sensor cells which correspond to polarization cells with similar polarization properties, wherein the groups of image sensor cells may be located in constant distances over the array of image sensor cells. This quality of system 10 may be used for providing additional features. For example, two similar images received on two image sensor cells a certain shift of distance between them may by combined for extraction of three-dimensional and/or depth information on the imaged scene, for example, by triangulation calculations. Therefore, a three-dimensional image may be created.

As indicated in block 680, the method may include communicating calibration data and/or commands to elements of system 10, such as, for example, image sensor 400, wavelength filter 300 and/or optical element 100 for performing calibration based on the deduced data. For example, calibration data and/or commands for adjusting the level of dark current noise of the image sensor cells and/or required exposure times may be detected as described above and communicated to image sensor 400, and/or to individual image sensor cells, to wavelength filter 300 and/or to optical element 100.

As indicated in block 690, the method may include outputting the deduced data and/or enhanced image and/or modified image after processing by image processing unit 500. For example, deduced information about the illumination, medium and/or image sensor may be communicated to a user and/or another processor, which may decide based on the information to modify illumination, medium and/or image sensor parameters. For example, deducted information about the imaged objects, surfaces and/or mediums may be communicated to a user, storage medium and/or another processor for further processing or any other use, according to the particular application.

While certain features of the invention have been illustrated and described herein, many modifications, substitutions, changes, and equivalents will now occur to those of ordinary skill in the art. It is, therefore, to be understood that the appended claims are are intended to cover all such modifications and changes as fall within the true spirit of the invention.

What is claimed is:

1. A system for analyzing polarization properties of light, the system comprising:
    an optical element for collecting light;
    a polarization filter having an array of polarization cells in various directions of polarization, the array of polarization cells comprising a core array of filter cells comprising a horizontal polarization filter cell, a vertical polarization filter cell, a no-polarization filter cell and a circular polarization filter cell;
    a wavelength filter comprising a plurality of repeated sub-arrays of wavelength filtering cells in various colors, each sub-array wavelength filtering cells correspond to a respective polarization cell of said polarization filter; and
    an image sensor comprising an array of image sensor cells, wherein at least one of said sub-arrays of wavelength filtering cells corresponds to a respective polarization cell of said polarization filter and to a respective group of cells of said image sensor, so that each image sensor cell in said respective group of cells is configured to receive light that passed through both a respective polarization cell and a respective wavelength filtering cell.

2. A system according to claim 1, further comprising an image processing unit for deducing polarization information based on image data received from said image sensor.

3. A system according to claim 2, wherein said image processing unit is further configured for communicating calibration data deduced from the polarization information to at least one of said image sensor, said wavelength filter and said optical element.

4. A system according to claim 1, wherein said array of polarization cells further comprises at least one additional layer of polarization cells of various polarization properties, said layer surrounding said core array.

5. A system according to claim 4, wherein at least some cells in said surrounding layer of polarization cells have each linear polarization property in a different direction.

6. A system according to claim 5, wherein said at least some cells have linear polarization properties in a constant phase difference between adjacent cells.

7. A polarization filter having an array of polarization cells comprising a core array of at least a horizontal polarization filter cell, a vertical polarization filter cell, a no-polarization filter cell and a circular polarization filter cell, and at least one layer of polarization filter cells surrounding said core array, said at least one layer of polarization filter cells comprising linear polarization filter cells with varying polarization phase, wherein the polarization phase difference between adjacent polarization filter cells in said layer being determined by dividing 360 degrees by the number of cells in the layer.

8. A method for analyzing polarization properties of light, the method comprising:
    receiving image data from a plurality of image sensor cells, the image data comprising data indicative of light passing through polarization filter cells comprising a horizontal polarization filter cell, a vertical polarization filter cell, a no-polarization filter cell and a circular polarization filter cell;
    separating from the received image data polarization information and scene image data of a scene being captured, said polarization information comprising at least degree and direction of polarization information;
    and processing the polarization information to deduce information.

9. A method according to claim 8, wherein said separation of polarization information and scene image data comprises comparison of image data received from several image sensor cells.

10. A method according to claim 8, wherein the deduced information comprises at least one of information about the optical and/or visual quality of the captured scene image, information about the scene being imaged and information about the image sensor cells.

11. A method according to claim 10, further comprising processing the captured image based on the deduced information.

12. A method according to claim 11, further comprising outputting at least one of the processed image and at least some of the deduced information.

13. A method according to claim 12, further comprising communicating calibration data to elements of said image sensing system.

* * * * *